United States Patent Office 2,775,986
Patented Jan. 1, 1957

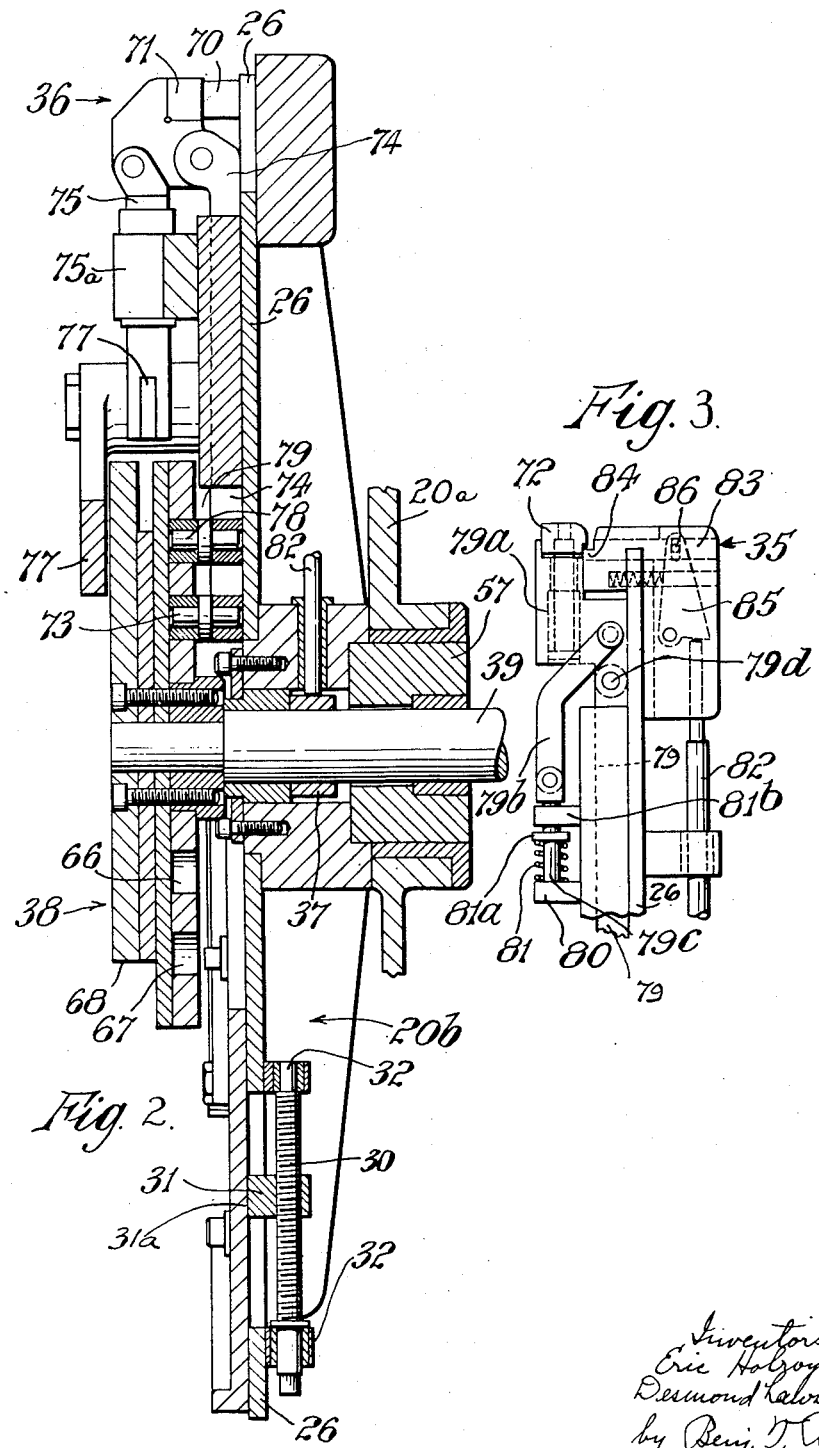

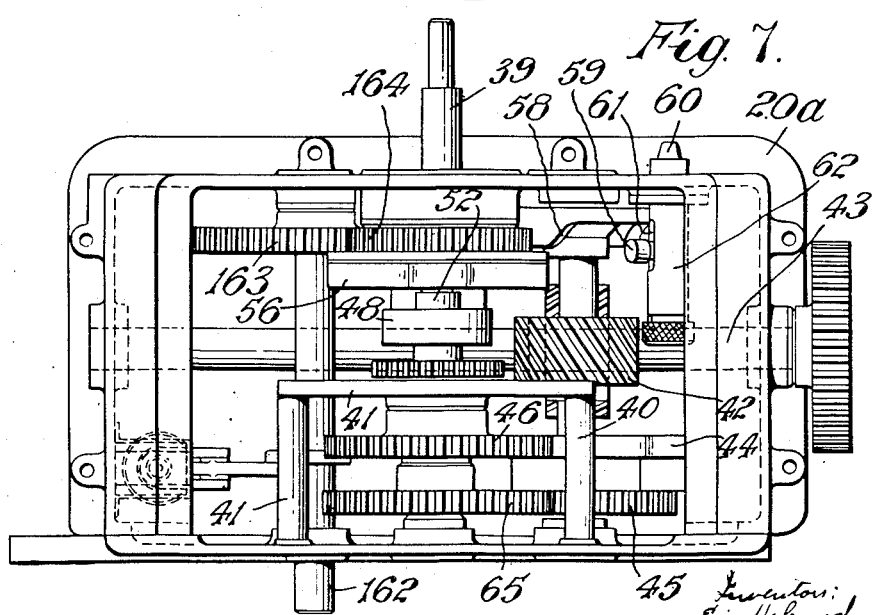

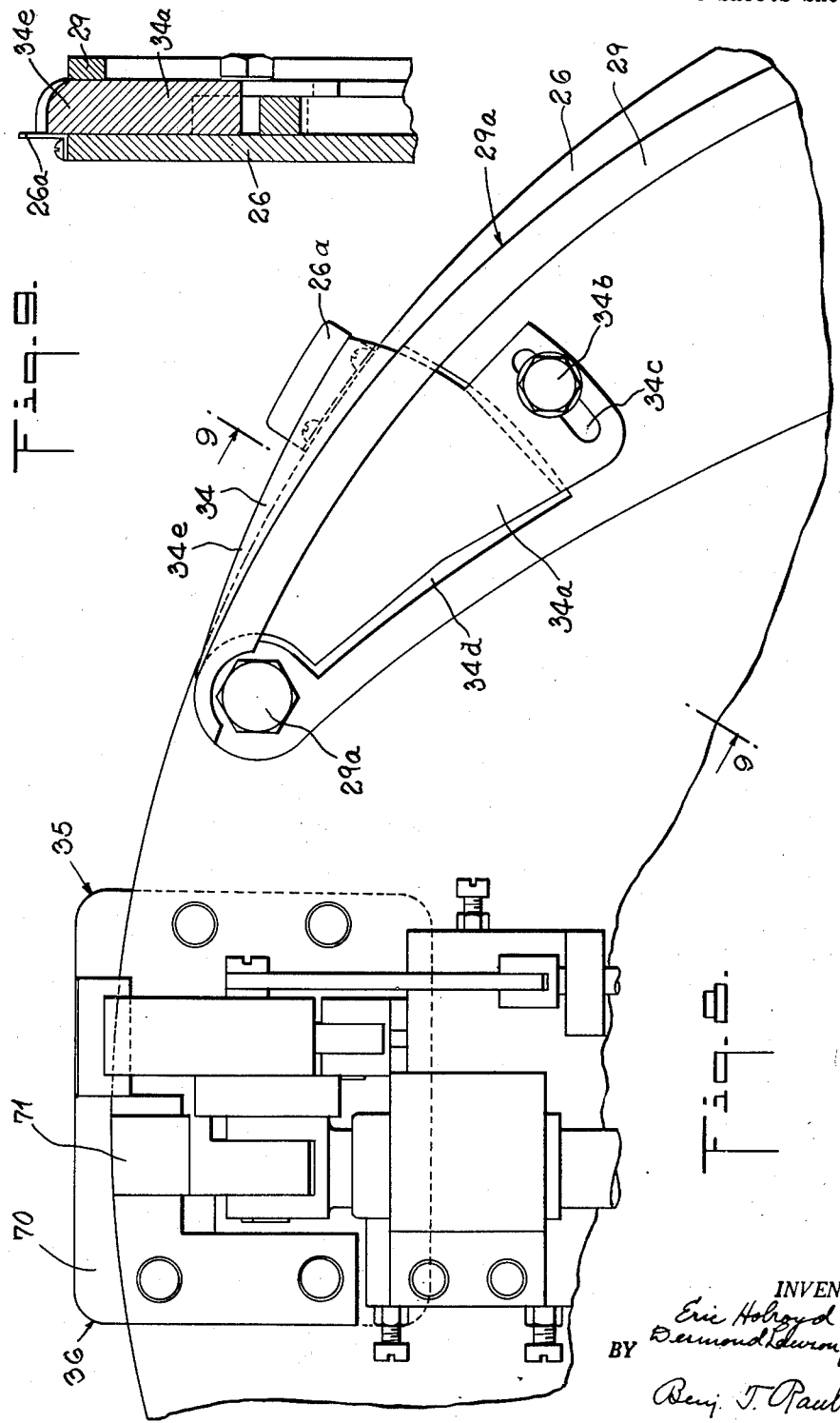

2,775,986

APPARATUS FOR THE AUTOMATIC FORMING OF A SHAPED LOOP OF WIRE FROM WIRE STOCK

Eric Holroyd, Speke, Liverpool, and Desmond Lawson Jenkins, Kirkby, England, assignors to Dunlop Tire and Rubber Corporation, Buffalo, N. Y., a corporation of New York Application September 12, 1952, Serial No. 309,212

3 Claims. (Cl. 140—88)

Our invention relates to apparatus for the automatic repetitive, production of shaped loops of wire from wire stock and, more particularly, to the production of shaped loops for use in the production of cycle tire bead wires.

According to our invention there is provided apparatus for the automatic production of shaped loops of wire from wire stock which comprises a loop former rotatable about its axis, means for rotating the loop former and for providing a dwell period between each revolution thereof, releasable clamping means for the free end of the wire stock, cutting means for the shaped loop, and means to operate said cutting means and said clamping means during the dwell period of the loop former. Preferably the cutting means is mounted on the loop former for rotation therewith.

The means for severing the shaped loop and for clamping or releasing the cut loop preferably comprise cams mounted co-axially with the loop former, said cams being actuated by rotation of the shaft on which the loop former is mounted.

The cutting means or guillotine is conveniently constructed in the form of a shearing block fixed to the loop former and a blade or cutting edge pivotally and reciprocably mounted with respect to the loop former. The clamping means suitably comprises a spring loaded, hook shaped, gripper to clamp the wire to the periphery of the loop former, said gripper being pivotally mounted so as to swing towards and away from the periphery of the loop former and being also mounted for radial movement with respect to the loop former.

Mechanism to reposition the loose end of the wire stock in readiness for the return of the clamping device after the cutting operation and removal of the cut loop has taken place is also provided and may take the form of a sliding bolt-like member operated through a cam to engage the wire and thereby position it for engagement with the clamping means when the latter returns to the clamping position.

Figure 5:
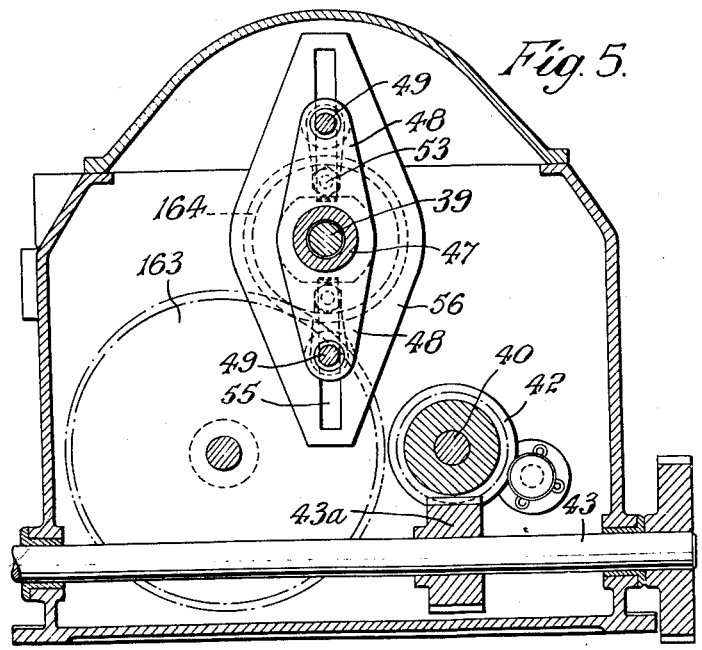
Figure 6:
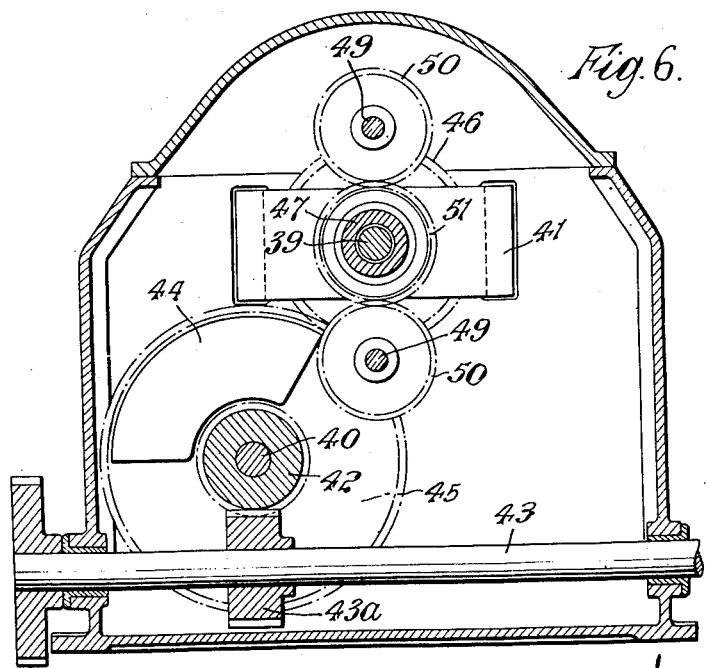

The invention is illustrated, by way of example, in a loop former particularly adapted for use with welding units of the kind described in our co-pending application Ser. No. 309,211, filed September 12, 1952, now Patent No. 2,723,330, and with units of the kind described in a co-pending application Ser. No. 309,074,, filed September 11, 1952, now Patent 2,708,228, for the removal of flash formed during the welding, to produce automatically and repetitively cycle tire bead wires. An embodiment of this loop former is shown in the accompanying drawings, in which, Fig. 1 is a front elevation of the loop former with parts broken away to show some of the interior construction, Fig. 2 is a cross section on the line I—I of Fig. 1, Fig. 3 is a fragmentary detail view of clamping means on the loop former, Fig. 4 is a sectional side elevation of the driving mechanism for the loop former and associated mechanism, Fig. 5 is a cross section on the line IV—IV of Fig. 4 viewed from the right hand side, Fig. 6 is a cross section on the line IV—IV of Fig. 4 viewed from the left hand side, Fig. 7 is a plan view of mechanism shown in Fig. 4 with the cover removed, Fig. 8 is a detail elevation of a part of the loop former, and Fig. 9 is a section of this detail taken on line 9—9 of Fig. 8.

In the embodiment of the invention illustrated in the above described drawings, wire is fed through feeding nozzle 25 fixed on a supporting casing 20a of the welding unit adjacent to the top of the loop former unit. This loop former unit comprises a circular back plate or disc 26 rotatable about its center as an axis and carrying three loop former segments 27, 28 and 29 about which the wire is wound to form the loop. Segment 27 is slotted at 27a and is held in position by guide blocks 27b on the plate or disc 26, to slide radially with respect to the plate 26 to selected positions of adjustment. Adjustment of this segment is effected by rotation of a lead screw 30 threaded through a boss 31 fixed on the segment 27 and journalled in brackets 32 secured to the back plate 26, Fig. 2. Radial movement of segment 27 effects movement of the loop segments 28 and 29 through arms 33 which connect one end of each of the loop segments 28 and 29 to the slidable segment 27, the other ends of segments 28 and 29 being permanently, pivotally, secured to the back plate 26 by pivots 28a and 29a. Adjustment of these segments enables an exact adjustment of the length of wire loop to be attained. The forming surface of the loop former has a slight radial projection 34 for a purpose to be hereinafter described.

Figure 1:
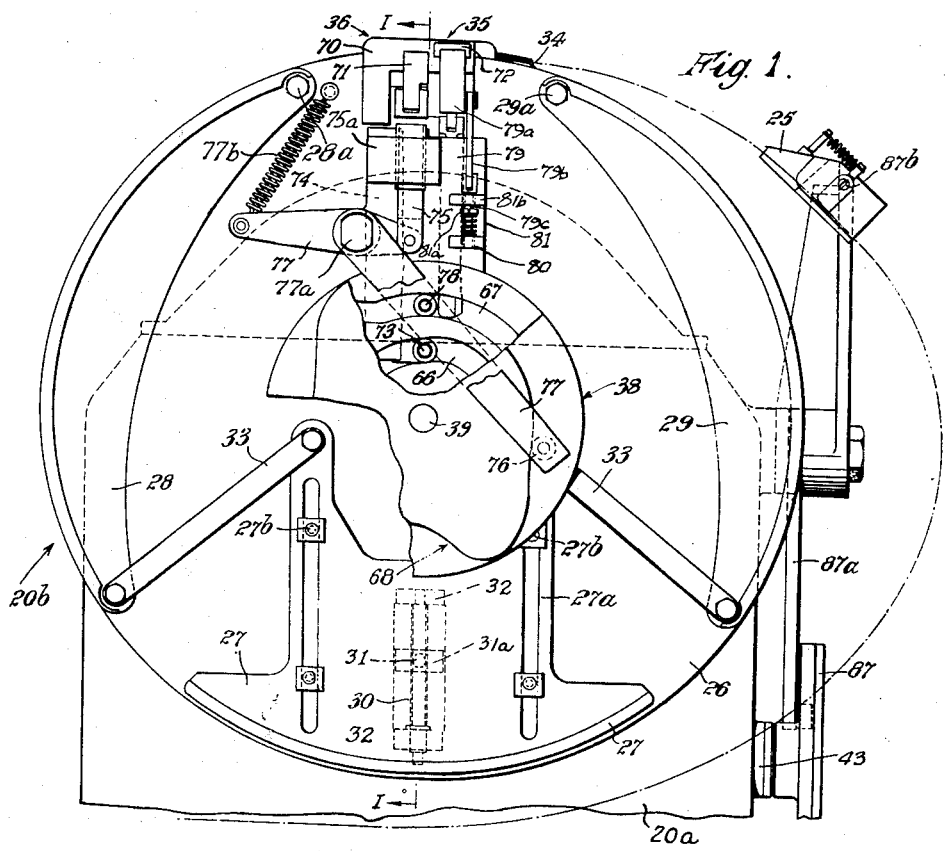

Between the pivots 28a and 29a of loop segments 28 and 29 there is fitted at the periphery of the back plate 26, clamping means and guillotine means generally indicated by reference numerals 35 and 36 and shown more particularly in Figs. 1, 2 and 3. The clamping and guillotine means are operated by an edge type cam mechanism 37, Fig. 2, at the rear of the loop former and a multi-purpose cam mechanism 38 at the front of the loop former, both of these cam mechanisms being mounted co-axially with the loop former on a shaft 39.

The drive for the loop former itself and for the co-axially mounted cams is contained within the casing 20a. This mechanism, shown in Figs. 4, 5, 6 and 7, comprises a driven shaft 39 and a lower shaft 40 supported in bushings in the walls of casing 20a. The lower shaft 40 is driven continuously through helical gear 42, itself driven by helical gear 43a on the main driving shaft 43 for the loop former. Keyed on the shaft 40 are a gear segment 44 for intermittently rotating the loop forming plate 26 a complete revolution and a gear 45 for driving cams which actuate the wire gripping and cutting devices during the dwell between the rotation of the plate 26. The transmission from the gear segment 44 to the plate 26 also comprises elements to give harmonic motion to the plate 26 to avoid sudden or abrupt starting and stopping of the plate and wire stock.

To this end gear segment 44 meshes with a pinion 46 fixed on a sleeve 47, freely rotatable on the upper shaft 39. This sleeve carries for rotation with it two arms 48 having crank shafts 49 in their extremities. At one end of each crank shaft is fixed a pinion 50 which meshes with a pinion 51 secured to a fixed U-shaped bracket 41 fixed to the housing as shown in Fig. 6. The other end of each crank shaft 49 has a crank arm 52 rigidly and non-rotatably attached thereto and the extremities of these arms carry pins 53 on which are freely mounted bronze slippers 54 slidable in radial slots 55 in a rotatable member 56 having a hub 57 rotatably mounted on the upper shaft 39.

Thus as the arms 48 rotate, the crank arms 52 are rotated by the planetary motion of the pinions 50 around the fixed pinion 51 and these crank arms move the bronze slippers 54 in the slot 55. Thus as the arms 48 rotate counterclockwise from the position shown in Fig. 5 the shaft 49 rotates about the shaft 39 with a constant angular velocity. The crank pins 53 move about the shaft 49 with constant angular velocity equal to the angular velocity of the shaft 49 about the shaft 39 but as the radius of the crank arm is less than the distance of the center of the shaft 49 from the center of the shaft 39 the linear speed is less, and due to its reversed position, the direction is opposite that of the shaft 49. The resultant speed of the crank pins about the shaft 39 is equal to the difference between the components of the speed of the shafts 49 and crank pins. As the rotation of these elements approaches 90° from the starting point the direction of movement of the crank pins approaches a radially outward direction and the component of their speed about the shaft approaches zero so that their resultant speed about the shaft 39 approaches that of the shaft 49 about the shaft 39. From 90° to 180° the direction of movement of the crank pins about the shafts 49 changes progressively to the direction of the shafts 49 about the shaft 39 so that the resultant speed at 180° is the sum of the linear speeds of the shafts 49 about the shaft 39 and of the crank pins 53 about the shaft 49. From 180° to 360° the reverse action occurs, the speed of the crank pins about the shaft 39 decreasing to the end of the cycle. The resultant speed of the crank pins about the shaft 39 is substantially harmonic and is imparted to the arms 56 and hub 57 to which the loop forming disc 26 is secured. This enables the wire and loop forming mechanism to be started slowly, reach a maximum speed at mid rotation and gradually decrease from that point to a stop. The loop forming mechanism is thus started and stopped gradually without abrupt changes. A cam 58 on the lower shaft 40, Fig. 7, is adapted to engage roller abutment 59, projecting radially from spring-loaded locking pin 60 and is able to slide in slot 61 of the locking pin housing 62. The locking pin 60 when urged forward by its spring, engages a socket (not shown) in the back plate 26 of the loop former and prevents rotation of the latter when segment 44 and pinion 46 are out of mesh.

Pinion 45 on lower shaft 40 meshes with a cam driving pinion 65 keyed to the upper shaft 39. Rotation of the upper shaft 39 gives a constant speed of rotation to the cam mechanisms 37, 38 operating the clamping and guillotine means 35 and 36. Cam mechanism 38, Figs. 1 and 2, at the front of the loop former is a multi-purpose cam having inner and outer tracks 66 and 67 cut in its rear face and an edge surface indicated by reference numeral 68 at its front face. Cam 37, Fig. 2, at the rear of the loop former 26b is also an edge type cam.

The guillotine 36 comprises a shearing block 70 fixed to the loop former back plate 26 slightly in advance of the clamp 35 so that as the back plate 26 rotates a full revolution counterclockwise the wire is drawn over the block 70, the end of the loop lying over the outer or peripheral face of the block as the revolution is completed. The guillotine also comprises a blade 71 normally out of the path of, and in front of, the block 70 as shown in Fig. 2. The blade 71 is pivotally supported on the upper end of a push rod 74 slidable radially outwardly in guides on the disc 26 to bring the pivotal axis of the blade to about the upper or peripheral face of the block 70 so that it may be swung downwardly to, or past, the edge of the block to shear or cut the wire. The rod 74 is off-set from direct radial position and extends as shown in Fig. 1 to the cam groove 66 which is so shaped as to move the rod radially inwardly and outwardly at the proper timed sequences.

The blade is swung on its pivot by a push rod 75 spaced outwardly of the rod 74 and slidable in a guide 75a on the rod 74. The push rod 75 is moved radially outwardly and inwardly by an arm of a lever 77, Fig. 1, pivotally mounted on the push rod 74 at 77a and having an arm extending downwardly to the edge of the cam 68. The downwardly extending arm has a roller bearing on the edge surface of the cam 68 and is kept in contact with the cam edge by a spring 77b tensioned between another arm of the lever 77 and the disc 26. The cam groove 66 and the edge of the cam 68 are so designed that as the cams rotate as a unit the groove moves the rod 74 radially outwardly together with the pivot 77a and rod 75 and then the edge of the cam 68 tilts the lever 77 to further move the rod 75 radially outwardly and swing the blade 71 to cut the wire.

A roller 78 in the outer track 67 operates a grip actuating push rod 79 and gives it an upward movement immediately after the guillotine has acted. Pivotally mounted on the upper end of push rod 79 is a carrier 79a for the clamping gripper 72, Fig. 3. The carrier 79a is anchored by a link 79b to a rod 79c, slidable in spaced guides 80 and 81b on the disc 26. A spring 81 is interposed between the bracket 80 and a collar 81a on the rod 79c. In action, when the push rod 79 rises, it first lifts the clamping gripper 72 vertically clear of the wire loop after which the collar 81a having come up against the bracket 81b holds the rod 79c and link 79b from further movement. As the rod 79 continues to move upwardly it causes the gripper 72 to swing about the pivot 79d clear of the wire. This enables the shaped loop to be withdrawn and when this has taken place, a push rod 82 actuated by a cam 37 operates a sliding bolt like member 83 with a cut-away portion 84 at its forward end so that it projects under the wire. A tilting part 85 with a slot 86 which engages the bolt like member 83 operatively connects the latter to the push rod 82 which engages the underside of the tilting part. This mechanism acts to position a loose end of the wire stock underneath the clamping device which subsequently moves back to clamp the wire to the loop former.

When the formed loop is cut, the loose end of the wire stock springs back slightly and, accordingly, in order correctly to position the cut end of the stock and to counteract the slight loss of length which would otherwise occur with the loop formed, the stock is temporarily deflected over radial projection 34 on the back plate 26. This is effected by a temporary displacement of the feeding nozzle 25, Fig. 1, this displacement being obtained by operation of a cam 87 acting on a lever 87a connected to the nozzle 25 at position 87b. Cam 87 is fixed on shaft 43. At the same time this displacement of the wire stock acts to leave a clearance between the two parallel lengths of wire at the cutting and clamping position. The nozzle 25 has spring controlled jaws (not illustrated) which, after the manner of a chuck, allow the wire to be fed forwardly and grip it to prevent it from springing back.

The specific construction of the protuberance is shown in a specific manner in Figs. 8 and 9. As shown therein the protuberance 34 comprises a plate 34a, Fig. 1, secured to the segment 29 by means of a bolt 34b projecting through an arcuate slot 34c formed in the plate 34a. The protuberance 34 fits into a cutaway portion 34d formed in the segment 29 and projects beyond the outer loop-forming surface 29a of the segment 29. The portion 34e of the protuberance which projects beyond this surface has a rounded profile, as shown in Fig. 9, and a bracket 26a is attached to the back plate 26 the function of which will be made clear with the description of the operation of the protuberance, which is as follows:

Prior to the severance of a formed loop from a length of wire stock the nozzle 25 (see Fig. 1) is temporarily displaced by means of the cam 87 so that the wire rides up the rounded profile of the protuberance 34 until it engages the bracket 26a. Thus, on account of the protuberance, a greater length of wire is drawn through the nozzle than would be the case were the wire to remain in position on the forming surface of the segment 29. This allows for the tendency of the wire to spring back after severance from the formed loop. The nozzle is re-positioned after the loop is cut from the stock and the free end of the wire is then gripped by the clamping means 35.

Initially the free end of the wire stock is fed through the nozzle 25 to the loop former 20 and is clamped thereto by clamping means 35 standing at the top of the loop former. The loop former is rotated and the first loop is shaped. As the dwell period commences, cam mechanism 38 acts to lift the guillotine blade 71 and then to move the blade across the wire to cut it, following which the clamping means 35 is released by operation of push rod 79. The shaped loop is then withdrawn and the bolt like member 83 through cam mechanism 37 acts to reposition the free end of the wire stock to be gripped by clamping means 35 for the next forward rotation of the loop former at the end of the dwell period.

As mentioned above, the free end of the wire stock is deflected over the slight radial projection 34 by displacement of the guide nozzle 25 in the course of feeding the stock for the production of the subsequent loops.

The rotatable loop former, in accordance with the present invention, is particularly adapted, as previously indicated, for use with welding units and flash removal units in the automatic, repetitive production of cycle tire bead wires as described in co-pending application Ser. No. 309,211, filed September 12, 1952. As described in that application the shaped loop is held by gripping fingers of a transfer mechanism before the cutting operation commences.

Having described our invention, what we claim is:

1. Apparatus for the automatic production of shaped loops of wire from wire stock which comprises a loop former rotatable about its axis and comprising a back plate, a pair of adjustable, loop forming, segments each pivotally mounted at one end on the back plate and having arcuate loop forming surfaces, a third, actuating segment having an arcuate loop forming surface, said actuating segment being slidable on the back radially with respect to the pivotally mounted segments, and links connecting said pivotally mounted segments to the actuating segment whereby radial movement of the actuating segment causes the pivoted segments to pivot on the back plate, means for rotating the loop former intermittently to provide a dwell period between each revolution thereof, a releasable clamping means on and rotatable with said loop former to receive the free end of the wire stock, a cutting means on and rotatable with said loop former positioned beyond the clamping means to cut a loop drawn onto the former at the free end of the loop and means to operate said cutting means and said clamping means during the dwell period of the rotation of the loop former.

2. Apparatus for the automatic production of shaped loops of wire from wire stock which comprises a loop former rotatable about its axis, means for rotating the loop former intermittently to provide a dwell period between each revolution thereof, releasable clamping means on and rotatable with said loop former to receive the free end of the wire stock, a cutting means on and rotatable with said loop former positioned beyond the clamping means to cut a loop drawn onto the former at the free end of the loop, means to operate said cutting means and said clamping means during the dwell period of the rotation of the loop former, an adjustable wire feeding nozzle for guiding wire stock to the loop former, a protuberance on the loop former adjacent to the forming surface, means for displacing the nozzle during the dwell period of the loop former so as to guide the wire stock over the protuberance and thereby draw out additional amount of wire to compensate for the amount by which the wire springs back after a formed loop is severed from the stock.

3. Apparatus for the automatic production of shaped loops of wire from wire stock which comprises a loop former rotatable about its axis, means for rotating the loop former intermittently to provide a dwell period between each revolution thereof, said means comprising a driving gear segment, a gear driven by said segment, an arm rotated by said gear, a crank shaft carried by said arm about the axis of rotation of said arm and having a planetary gear and a crank arm, a fixed gear engaging said planetary gear and a slotted arm engaged by said crank arm and driving said loop former, a releasable clamping means on and rotatable with said loop former to receive the free end of the wire stock, a cutting means on and rotatable with said loop former positioned beyond the clamping means to cut a loop drawn onto the former at the free end of the loop and means to operate said cutting means and said clamping means during the dwell period of the rotation of the loop former.

References Cited in the file of this patent

UNITED STATES PATENTS

| | | |
|---|---|---|
| 689,578 | Dice | Dec. 24, 1901 |
| 705,130 | Perry | July 22, 1902 |
| 746,442 | Bates | Dec. 8, 1903 |
| 1,079,075 | Truman | Nov. 18, 1913 |
| 1,307,735 | Hank | June 24, 1919 |
| 1,457,691 | Bull | June 5, 1923 |
| 1,895,427 | Steuer | Jan. 24, 1933 |
| 1,995,916 | Collins | Mar. 26, 1935 |
| 2,083,350 | Shook | June 8, 1937 |
| 2,190,805 | Shook | Feb. 20, 1940 |
| 2,683,474 | Langenberg | July 13, 1954 |